United States Patent
Hu et al.

(10) Patent No.: US 12,145,860 B2
(45) Date of Patent: Nov. 19, 2024

(54) CATHODE MATERIAL AND MANUFACTURING METHOD THEREOF, LITHIUM ION BATTERY, AND VEHICLE

(71) Applicant: BYD COMPANY LIMITED, Guangdong (CN)

(72) Inventors: Dongjie Hu, Shenzhen (CN); Hao Wei, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 743 days.

(21) Appl. No.: 17/259,106

(22) PCT Filed: Jul. 10, 2019

(86) PCT No.: PCT/CN2019/095351
§ 371 (c)(1),
(2) Date: Jan. 8, 2021

(87) PCT Pub. No.: WO2020/011177
PCT Pub. Date: Jan. 16, 2020

(65) Prior Publication Data
US 2021/0292186 A1    Sep. 23, 2021

(30) Foreign Application Priority Data
Jul. 10, 2018 (CN) .......................... 201810753608.X

(51) Int. Cl.
*H01M 10/0525* (2010.01)
*C01G 53/00* (2006.01)
(Continued)

(52) U.S. Cl.
CPC ............ *C01G 53/56* (2013.01); *H01M 4/366* (2013.01); *H01M 4/38* (2013.01); *H01M 4/505* (2013.01);
(Continued)

(58) Field of Classification Search
CPC ........ H01M 4/366; H01M 4/38; H01M 4/505; H01M 10/0525
See application file for complete search history.

(56) References Cited

U.S. PATENT DOCUMENTS 6,368,749 B1    4/2002 Yanai et al.
2014/0315100 A1*  10/2014 Wang ................... H01M 4/625
                                                    429/231.95
(Continued)

FOREIGN PATENT DOCUMENTS

CN     102386389 A    3/2012
CN     102683659 A    9/2012
(Continued)

OTHER PUBLICATIONS

Choi et al. Angew. Chem. Int. Ed. 2012, 51, 9994-10024, Challenges Facing Lithium Batteries and Electrical Double-Layer Capacitors.*
(Continued)

*Primary Examiner* — Olatunji A Godo

(57) ABSTRACT

A cathode material, a preparation method thereof, a lithium ion battery and a vehicle are provided. The cathode material comprises elemental sulfur and secondary particles formed by packing primary particles, wherein the secondary particles have a hollow structure, and the elemental sulfur fills in gaps among the primary particles and in the hollow structure. The primary particles comprise a lithium oxide, wherein the lithium oxide comprises $\delta \text{LiNi}_m\text{Co}_n\text{X}_{(1-m-n)}\text{O}_2 \cdot (1-\delta)\text{Li}_2\text{MO}_3$, $0 \le \delta \le 1$, X comprises at least one selected from Mn, Al, Nb, and Fe, M comprises at least one of Mn, Al, Nb, Fe, Co, and Ni, $0 \le m<1$, $0 \le n<1$, and $0 \le m+n<1$.

20 Claims, 2 Drawing Sheets

(51) Int. Cl.
  *H01M 4/36* (2006.01)
  *H01M 4/38* (2006.01)
  *H01M 4/505* (2010.01)
  *H01M 4/02* (2006.01)
  *H01M 4/525* (2010.01)

(52) U.S. Cl.
  CPC ..... *H01M 10/0525* (2013.01); *C01P 2004/34* (2013.01); *C01P 2004/64* (2013.01); *H01M 2004/021* (2013.01); *H01M 2004/028* (2013.01); *H01M 4/525* (2013.01)

(56) References Cited

U.S. PATENT DOCUMENTS

| | | | |
|---|---|---|---|
| 2016/0049645 | A1 | 2/2016 | Zheng et al. |
| 2020/0161632 | A1* | 5/2020 | Yamashita ............ H01M 4/806 |

FOREIGN PATENT DOCUMENTS

| | | | |
|---|---|---|---|
| CN | 102723470 | A | 10/2012 |
| CN | 103187563 | A | 7/2013 |
| CN | 103199258 | A | 7/2013 |
| CN | 103700860 | A | 4/2014 |
| CN | 103972464 | A | 8/2014 |
| CN | 104253275 | A | 12/2014 |
| CN | 104272504 | A | 1/2015 |
| CN | 204118182 | U | 1/2015 |
| CN | 105304908 | A | 2/2016 |
| CN | 105336915 | A | 2/2016 |
| CN | 105406059 | A | 3/2016 |
| CN | 105529446 | A | 4/2016 |
| CN | 106549157 | A | 3/2017 |
| CN | 106549175 | A | 3/2017 |
| CN | 107017387 | A | 8/2017 |
| CN | 107017388 | A | 8/2017 |
| CN | 107681114 | A | 2/2018 |
| CN | 107785537 | A | 3/2018 |

OTHER PUBLICATIONS

2013 Amalraj et al. (J. Electrochem. Soc. 160 A324, 2013).*
International Search Report and Written Opinion for Application No. PCT/CN2019/095351, mailed on Sep. 23, 2019, 8 pages.
Auvergniot et al., "Interface Stability of Argyrodite Li6PS5CI toward LiCoO2, LiNi1/3Co1/3Mn1/3O2, and LiMn2O4 in Bulk All-Solid-State Batteries", Chemistry of Materials, vol. 29, No. 9, May 2017, pp. 3883-3890.
Idemoto et al., "Characterization, average and electronic structures during charge-discharge cycle in 0.6Li2MnO3-0.4Li(Co1/3Ni1/3Mn1/3)O2 solid solution of a cathode active material for Li-ion battery", Journal of Power Sources, 2015, vol. 273, pp. 1023-1029.

* cited by examiner

CATHODE MATERIAL AND MANUFACTURING METHOD THEREOF, LITHIUM ION BATTERY, AND VEHICLE

CROSS-REFERENCE TO RELATED APPLICATIONS

This application is a national phase application of International Patent Application No. PCT/CN2019/095351, filed with the China National Intellectual Property Administration (CNIPA) on Jul. 10, 2019, which is based on and claims priority to and benefit of Chinese Patent Application No. 201810753608.X filed on Jul. 10, 2018 with the CNIPA and entitled "Cathode Material and Manufacturing Method thereof, Lithium Ion battery, and Vehicle." The content of all of the above applications is incorporated herein by reference in its entirety.

FIELD

This application relates to the field of materials and new energy, and in particular, to a cathode material, a preparation method thereof, a lithium ion battery, and a vehicle.

BACKGROUND

Among various kinds of new energy batteries, due to the high specific energy, high voltage, low self-discharge, good safety performance, and long cycle life, a lithium ion battery has attracted wide attentions, and is successfully industrialized. The main components of the lithium ion battery include an electrolyte, a separator material, and a cathode and an anode material. The performance of the cathode material directly affects the battery performance, so the cathode material is the key to the development and performance improvement of the lithium ion battery.

The addition of sulfur element to the cathode material can increase the lithium binding capacity of the cathode material, thereby allowing the battery to have a high theoretical specific capacity of and a high overall energy density.

SUMMARY

In one aspect of this application, this application proposes a cathode material. The cathode material comprises elemental sulfur and secondary particles formed by packing primary particles, where the secondary particles have a hollow structure, and the elemental sulfur is filled in the gaps among the primary particles and in the hollow structure; and the primary particles comprise lithium oxide comprising $\delta \text{LiNi}_m\text{Co}_n\text{X}_{(1-m-n)}\text{O}_2 \cdot (1-\delta)\text{Li}_2\text{MO}_3$, wherein $0 \leq \delta \leq 1$, X includes at least one selected from Mn, Al, Nb, and Fe, M includes at least one selected from Mn, Al, Nb, Fe, Co, and Ni, $0 \leq m < 1$, $0 \leq n < 1$, and $0 \leq m+n < 1$. The hollow structure of the secondary particles is suitable for filling with the sulfur element. The shell structure of the secondary particles formed by packing primary particles is densely packed and has a low porosity, which can prevent sulfur from dissolving in the electrolyte. The structure of the secondary particles does not reduce the overall compaction density of the material, thereby increasing the volume energy density of the cathode material.

In another aspect of this application, this application proposes a method for preparing a cathode material comprising cathode material particles. The method includes: adding a solution containing metal ions, a complexing agent, and a precipitating agent to a reactor while stirring, co- precipitating at pH 11-12 to form a primary particle precursor, forming a core precursor by packing the primary particle precursor, and forming a secondary particle precursor by further packing the primary particle precursor at pH 9-10.5; mixing the secondary particle precursor with a lithium source, and baking to obtain secondary particles having a hollow structure; and mixing the secondary particles with a sulfur source, melting and solidifying, to fill elemental sulfur into the hollow structure, where the secondary particles have a shell layer for defining a hollow structure, and the shell layer is formed by packing primary particles; and the primary particles comprises lithium oxide comprising $\delta \text{LiNi}_m\text{Co}_n\text{X}_{(1-m-n)}\text{O}_2 \cdot (1-\delta)\text{Li}_2\text{MO}_3$, in which $0 \leq \delta \leq 1$. X includes at least one selected from Mn, Al, Nb, and Fe, M includes at least one selected from Mn, Al, Nb, Fe, Co, and Ni, $0 \leq m < 1$, $0 \leq n < 1$, and $0 \leq m+n < 1$. The secondary particles obtained by this method have a microstructure suitable for filling with the sulfur element. The shell layer outside the hollow structure of the secondary particles is densely packed. At a high temperature, liquid sulfur can enter the internal pores, and the densely structured outer shell layer can prevent the polysulfide intermediate from dissolving in the electrolyte. Moreover, the particle structure of the secondary particles does not reduce the overall compaction density of the material, thereby increasing the volume energy density of the cathode material.

In another aspect of this application, this application proposes a lithium ion battery. The lithium ion battery includes the foregoing cathode material or the cathode material prepared by the foregoing method. Therefore, the lithium ion battery has a higher energy density and a better cycle life.

In another aspect of this application, this application proposes a vehicle. The vehicle includes a lithium ion battery as described above. Therefore, the vehicle has all the features and advantages of the lithium ion battery described above, which will not be repeated here.

DETAILED DESCRIPTION

Figure 1:
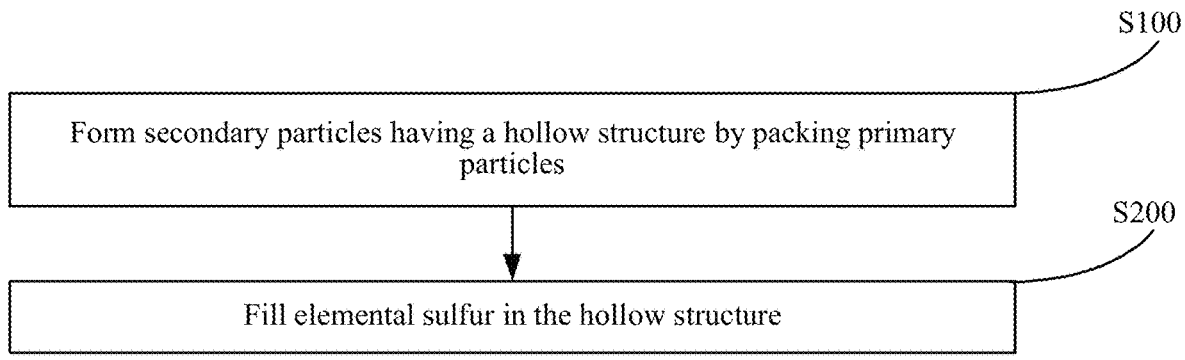
FIG. 1 is a process flow chart of a preparation method according to an embodiment of the present application.

Embodiments of the present application are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and used only for explaining the present application, and should not be construed as a limitation on the present application.

Endpoints of all ranges and all values disclosed herein are not limited to the precise ranges or values, and these ranges or values should be understood as including values close to these ranges or values. For value ranges, endpoint values of the ranges, the endpoint values of the ranges and individual point values, and the individual point values can be combined with each other to obtain one or more new value ranges. These value ranges should be construed as being specifically disclosed in the present specification.

This application is accomplished on the basis of the inventor's discovery and insight into the fact that:

Due to the electronic inertness of sulfur and the easy dissolution in an organic solvent of a sulfur intermediate during lithium intercalation, the cathode material containing sulfide ions suffers a greater limitation in practical applications. Although the above problem can be alleviated to a certain extent by compounding carbon as a carrier with the cathode material, simply relying on elemental carbon to segregate the electrolyte to prevent sulfur from dissolving in the electrolyte will not only increase the production cost of the cathode material, extend production process, and reduce the production efficiency, but also make it difficult to fundamentally solve the above-mentioned problem of sulfur-based cathode materials. After in-depth researches, the inventors find that, in sulfur-based cathode materials, the problem of easy dissolution of sulfur in the electrolyte is largely caused by the structure of the cathode active material that is not suitable for filling with sulfur atom.

In one aspect of this application, this application proposes a sulfur-containing cathode material. The cathode material includes elemental sulfur and secondary particles formed by packing primary particles. The secondary particles have a hollow structure, and the elemental sulfur fills in the gaps among the primary particles and in the hollow structure. The primary particles comprise lithium oxide. The hollow structure of secondary particles is suitable for filling with the sulfur element. The primary particles in the shell layer are densely packed, which can prevent sulfur from dissolving in the electrolyte. The structure of the secondary particles does not reduce the overall compaction density of the material, thereby improving the volume energy density of the cathode material.

Hereinafter, the cathode material will be explained in detail by way of specific embodiments of the present application.

According to an embodiment of the present application, the specific chemical composition of the lithium oxide is not particularly limited, and can be selected by those skilled in the art according to actual situations. For example, according to some embodiments of the present application, the lithium oxide may be composed of ternary materials. Specifically, the chemical formula of lithium oxide is $8\text{LiNi}_m\text{Co}_n\text{X}_{(1-m-n)}\text{O}_2 \cdot (1-\delta)\text{Li}_2\text{MO}_3$, where $0 \le \delta \le 1$, X includes at least one selected from Mn, Al, Nb, and Fe, M includes at least one selected from Mn, Al, Nb, Fe, Co, and Ni, $0 \le m < 1$, $0 \le n < 1$, and $0 \le m+n < 1$. More specifically, the average valency of M in $\text{Li}_2\text{MO}_3$ can be +4. The average valency of X in $\text{LiNi}_m\text{Co}_n\text{X}_{(1-m-n)}\text{O}_2$ can be between +3 and +4. Secondary particles can be obtained with the lithium oxide that meets the above chemical composition by simply controlling the synthesis process.

According to a specific embodiment of the present application, the ternary material may include a nickel cobalt manganese (NCM) ternary material, a nickel cobalt aluminum (NCA) ternary material, or a lithium-rich material. The nickel cobalt manganese (NCM) ternary material can be type 111 (N:C:M=1:1:1, the following type numbers represent the atomic ratio of nickel, cobalt, and manganese in the ternary material, which will not be repeated), type 433, type 532, type 666, or type 811. The nickel cobalt aluminum (NCA) ternary material may be, for example, $\text{LiNi}_{0.8}\text{Co}_{0.15}\text{Al}_{0.05}\text{O}_2$. According to other embodiments of the present application, the lithium oxide can include $\text{LiNi}_{1-x-y}\text{Co}_x\text{Mn}_y\text{O}_2$, in which Mn may be replaced by any one of Al, Nb, and Fe, or 2, 3, or 4 of Mn, Al, Nb, and Fe are contained. When more than one element of Mn, Al, Nb, and Fe is contained, the total atomic content of the more than one element of Mn, Al, Nb, and Fe in the ternary material meets $\text{LiNi}_{1-x-y}\text{Co}_x\text{Mn}_y\text{O}_2$.

According to an embodiment of the present application, the secondary particles may be formed by packing lithium oxide containing nanoparticles, that is, primary particles. It should be noted that the hollow structure of the secondary particles refers to a cavity area defined by the shell layer formed by closely packing the primary particles. Therefore, the secondary particles have a core-shell structure, the shell layer obtained by closely packing the primary particles is the "shell layer", and the hollow structure is the "core". Taking the outer surface of the core-shell structured secondary particles as the 0 point of the thickness, the average thickness of the shell layer can be 1-10 μm, such as 0.5-5 μm, or 2-3 μm, and the average particle size of the secondary particles is 5-50 μm. The shell layer is formed by closely packing the above-mentioned nanoparticles, and the shell layer has pores so that elemental sulfur can enter the hollow structure through the pores for filling. In the secondary particles, the area inside the shell layer is the cavity of the hollow structure. In the process of forming the secondary particles, the particles are first packed loosely, and then packed densely. As a result, a precursor with loosely packed center and densely packed peripheral area is formed. By heating, the loose structure inside can form a hollow structure According to an embodiment of this application, the average pore diameter in the hollow structure is larger than the gaps among the primary particles in the finally obtained secondary particles. The gaps among the primary particles may be 0.02-1 μm, such as 0.5 μm. It should be particularly noted that the hollow structure can be filled with elemental sulfur or partly filled with elemental sulfur. Moreover, the elemental sulfur content in the hollow structure is higher than the elemental sulfur content in the gaps among the primary particles. In other words, the elemental sulfur is mainly filled in the hollow structure. Based on the total weight of the cathode material, the content of elemental sulfur in the hollow structure is 5-40 wt %, and the content of elemental sulfur in the gaps among the primary particles is 0-15 wt %. As a result, the shell layer can serve to protect the elemental sulfur in the hollow structure, to prevent the potential dissolution of a small amount of elemental sulfur in gaps in the shell layer by the electrolyte during the cycle process in practical use, resulting in a decrease in the performance of the cathode material. By controlling the ratio of precursor particles to elemental sulfur, the elemental sulfur in gaps in the shell layer can be effectively reduced.

According to an embodiment of this application, the primary particles are one or more selected from rod-shaped lithium oxide and bulk lithium oxide, and the primary particles are packed to form a secondary particle precursor. The specific morphology and size of the primary particles is not particularly limited. Specifically, the length of the primary particles may be 0.5-2 μm, the width may be 200-500 nm, and the aspect ratio may be 2-40. In the initial stage of forming the secondary particle precursor, the primary particles are packed loosely, and when the peripheral outer shell layer is formed, the primary particles are packed densely.

Therefore, through the subsequent simple heat treatment, it is possible to obtain secondary particles that are relatively loose and include a cavity in the center, and are densely packed in the peripheral area. The porosity of the secondary particles may be 20-30%. According to an embodiment of this application, the secondary particle precursor before the heat treatment and the secondary particles formed with a hollow structure after heating are respectively subjected to a mercury intrusion test. Comparison of the test results show that the pore size distribution of the secondary particle precursor before heating is mainly centralized in a small range, and no hollow part is formed at this time, so the pores are mainly determined by the pores among the loosely packed primary particles and the pores among the peripheral densely packed primary particles. After the heat treatment, the pore size of 2-10 μm dominates in the pore size distribution shown by the mercury intrusion test, indicating that a hollow structure is formed after the heat treatment.

It should be particularly noted that in this application, the term "nanoparticles", or "primary particles", specifically means that the size in any dimension such as length, diameter, and width is at the nanometer level. The shape of the secondary particles formed by packed nanoparticles is not particularly limited, for example, one of spherical, rhombic, and ellipsoidal shapes.

According to an embodiment of the present application, the sulfur content in the cathode material is not particularly limited, and can be selected by those skilled in the art according to actual situations. For example, according to some embodiments of the present application, the content of elemental sulfur can be 2-50 wt %, and the content of lithium oxide can be 50-98 wt %, based on the total weight of the cathode material. According to a specific embodiment of the present application, the sulfur content can be determined according to the volume of the hollow structure. The present inventors find that if the load of elemental sulfur is too high, the excess sulfur is likely to cause damage to the main structure of the secondary particles. According to a specific embodiment of this application, the content of elemental sulfur may be 10-30 wt %. Elemental sulfur can be melted and penetrate into the hollow structure of the core-shell structure.

According to an embodiment of this application, a shell layer with a relatively dense structure that completely encloses the hollow structure is present outside the hollow structure. Therefore, the elemental sulfur in the hollow structure can be better isolated from the electrolyte. In addition, the shell layer serving to isolate the electrolyte comprises lithium oxide. Unlike a cathode material that simply uses a coating of such as a carbon material to isolate elemental sulfur, the cathode material according to the embodiments of this application has a better isolation structure formed with lithium oxide, which can prevent the elemental sulfur from being dissolved by the electrolyte, without reducing the overall compaction density and electrochemical performance of the cathode material. For the cathode material according to the embodiments of this application, secondary particles with a hollow structure are firstly formed, and then elemental sulfur fills in the hollow structure of the secondary particles. Thus, the elemental sulfur can completely fill the hollow structure or partially fill the hollow structure according to actual needs. Regardless of condition of filling of elemental sulfur, the elemental sulfur is externally protected by a closed shell layer. Unlike a coated cathode material that is formed by simply mixing sulfur and a coating material (such as a cathode active material powder) and followed by post-treatments (such as evaporation of solvent and heating, etc.), the cathode material according to the embodiments of this application can better prevent the dissolution of elemental sulfur in the electrolyte. It is difficult to ensure that the coated cathode material prepared by mixing sulfur and the coating material can form a closed shell layer on the exterior of elemental sulfur. A structure of sulfur-containing cathode material that has elemental sulfur as the core and has a coating formed outside of the core is also provided in the prior art. The cathode material of this structure does not have a hollow structure. In practical use, there is no buffer space inside the cathode upon expansion or contraction.

In some embodiments of this application, to improve the electrochemical performance of the cathode material, a coating can be formed on the outer surface of the secondary particles. The material of the coating is not particularly limited, and familiar materials can be used by those skilled in the art to form the coating. For example, according to a specific embodiment of this application, the material of the coating may include any one or more of a carbon material, tin dioxide, manganese dioxide, titanium dioxide, tricobalt tetraoxide, vanadium pentoxide, iron disulfide, copper disulfide, cobalt disulfide, or bismuth trisulfide. In some other embodiments of this application, the content of the coating is 0.1 to 10 wt %, based on the total weight of the cathode material. In another embodiment of the present application, a carbon coating is used, and the carbon coating is formed on the outer surface of the sulfur-filled secondary particles. Therefore, the electrochemical performance of the cathode material is improved. The specific thickness, material, morphology, and synthesis method of the carbon coating are not particularly limited, and familiar materials and methods can be used by those skilled in the art according to actual situations to form the carbon coating. Accordingly, the electrolyte can be blocked from entering the interior of the secondary particles, to reduce the dissolution of elemental sulfur in the electrolyte. In some specific embodiments of this application, the coating is a titanium dioxide coating. In other specific embodiments of this application, the weight ratio of lithium oxide, sulfur, and titanium dioxide in the cathode material can be (90-45):(5-50):(2-8). For example, specifically, the coating amount of titanium dioxide accounts for 5 wt %.

In another aspect of this application, this application proposes a method for preparing a cathode material comprising cathode material particles. The cathode material can have all the features and advantages of the above-described cathode material. Specifically, referring to FIG. 1, the method includes:

S100: Form secondary particles having a hollow structure by packing primary particles.

According to an embodiment of the present application, in this step, secondary particles are formed. As mentioned above, the secondary particles can be formed by packing primary particles (nanoparticles). The shell layer of the secondary particles is densely packed. Because of the hollow structure in the center, the porosity of the shell layer is lower than that of the central area. The hollow structure of secondary particles is suitable for filling of sulfur element. The shell layer is densely packed, which can prevent sulfur from dissolving in the electrolyte. The structure of the particle structure does not reduce the overall compaction density of the material, thereby improving the volume energy density of the cathode material. The specific structure of the secondary particles has been described in detail above, and will not be repeated here again. Specifically, the secondary particles have a core-shell structure, the shell layer obtained by densely packing the primary particles is the "shell layer", and the hollow structure is the "core". The above-mentioned structure with a densely packed surface and a cavity in the center can be obtained by controlling the reaction rate when the secondary particles are formed.

Figure 2:
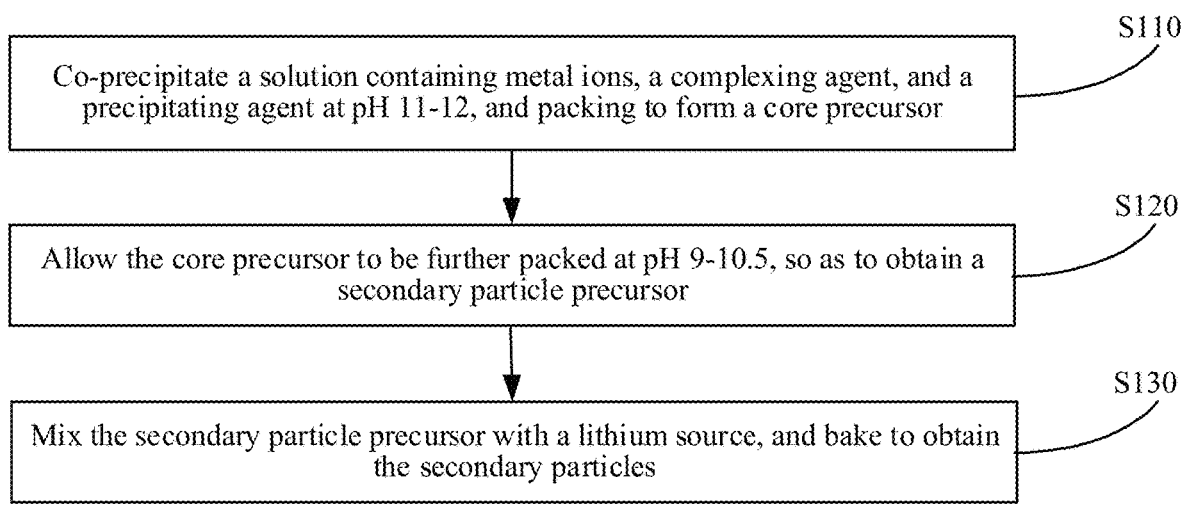
FIG. 2 is a partial process flow chart of a preparation method according to an embodiment of the present application.

According to a specific embodiment of this application, referring to FIG. 2, the secondary particles with a core-shell structure, that is, the secondary particles with a porous microspherical structure in the center and a densely packed shell structure at the peripheral area can be obtained through the following steps.

S110: Co-precipitate a solution containing metal ions, a complexing agent, and a precipitating agent at pH 11-12 to form a primary particle precursor, which is packed to form a core precursor.

According to an embodiment of this application, in this step, the solution containing metal ions, the precipitating agent, and the complexing agent are added to the reactor (for example, a hydrothermal reactor or other reactor) while stirring, and co-precipitated. The primary particle precursor formed by co-precipitation is packed to obtain the core precursor. In this step, the pH of the reaction solution is controlled at 11-12, so as to achieve rapid precipitation and form a loosely packed core. Specifically, by adjusting the rate of adding the metal ion solution and the complexing agent, and the rate of adding the precipitating agent (which can be used to control the pH value of the mixed solution), the growth and packing rates of the core precursor formed by packing the primary particle precursor formed by co-precipitation can be controlled. Specifically, the rates of adding the metal ion solution, the complexing agent, and the precipitating agent can be controlled by controlling their pumping speed or dropping speed. At this stage, the reaction is faster, resulting in the formation of a loosely packed core precursor.

In this step, the morphology of the core precursor can be controlled by adjusting the stirring speed (300-2000 rpm), reaction temperature (30-50° C.), reaction pH (11-12), and the concentration of the complexing agent (0.01-0.03 mol/L). Specifically, the gradually added precipitating agent can provide a shear force during the formation of the core precursor, to allow the primary particle precursor in the reactor to gradually grow and be packed. By comprehensively controlling the stirring speed, the reaction temperature, the reaction pH, and the concentration of the complexing agent, the size of the primary particle precursor formed can be controlled. In this way, a primary particle precursor with a specific morphology (for example, a rod shape) is obtained.

According to an embodiment of the present application, the metal can be provided by a solution containing metal ions, and more specifically, can be provided by an inorganic salt solution containing metal elements. The metal element includes at least one of Mn, Al, Nb, Fe, Co, and Ni, and the metal salt solution is added to the reactor while be stirred. The metal salt solution and the complexing agent are added to a solvent while be stirred to obtain a mixed solution. The above process can be carried out with heating, for example, at 30° C.-60° C., such as 45° C., 50° C., or 55° C. Specifically, the reactor can be placed in a water bath at 40° C.-60° C. The metal salt solution may include a solution for forming an NCM or NCA material (without Li), and may be at least one of a nickel-containing salt solution, a cobalt-containing salt solution, and a manganese-containing salt solution, for example, a nitrate solution containing the above-mentioned metal ions. The complexing agent used in the preparation process can form a stable complex with the metal ions to further control the rate of precipitation. The commonly used complexing agent includes an alkaline solution, such as aqueous ammonia. The concentration of aqueous ammonia can be 5-15 wt %. The specific chemical composition of the metal salt solution can be determined according to the content of metal elements in the lithium oxide to be formed. The chemical composition of the lithium oxide has been described in detail above, and will not be repeated here again.

According to an embodiment of the present application, the solution containing metal ions, the complexing agent, and the precipitating agent are added to the reactor at a fixed ratio while be stirred. The fixed ratio is determined according to the chemical composition of lithium oxide. The rate of adding the above-mentioned materials to the reactor can be adjusted by those skilled in the art according to the volume of the reactor and the total amount of the materials added. For example, a slow addition process can last 2-6 hours, such as 4 hours or 5 hours.

According to an embodiment of the present application, the precipitating agent can be a reagent that can precipitate metal ions, and mainly includes various alkaline solutions, including an aqueous solution of a hydroxide, such as potassium hydroxide, sodium hydroxide, and the like. The precipitating agent can be pumped into the reactor containing the mixed solution by a variable speed transmitter. The pumping speed of the precipitating agent can be determined based on the pH value of the reaction system (i.e., the precursor solution). The pH value is controlled at a fixed value during the reaction. During the reaction process, with the co-precipitation with hydroxide, the hydroxide ions in the system are consumed, and the pH value of the system decreases. Therefore, a precipitating agent needs to be added to ensure the pH value of the precursor solution. When the pH value rises to a set value, the addition of the precipitating agent is stopped. Generally, the pH value is kept unchanged during the reaction, that is, the pumping speed of the precipitating agent does not change, and the ratio of the added precipitating agent to the metal salt solution is about 2:1. According to an embodiment of this application, in this step, the pH value of the mixed solution is controlled to be higher than that in the subsequent packing process, for example, 12.0 or 11.0.

S120: Allow the core precursor to be further packed at pH 9-10.5, so as to obtain secondary particle precursor.

According to an embodiment of this application, in this step, the metal salt solution, complexing agent, and precipitating agent are supplied to the reactor at pH 9-10.5, so that the primary particle precursor is slowly precipitated to form a relatively dense shell layer, to obtain the secondary particle precursor. The rates of supplying the metal salt solution, complexing agent, and precipitating agent to the reactor are reduced, so that the primary particle precursor continues to be densely packed on the basis of the core precursor formed by the primary particle precursor in Step S110, so as to form a denser shell layer in subsequent treatment.

According to an embodiment of the present application, the supply rate in this step, that is, the rate at which the reactants are added to the reactor, can be ⅓ to ½ of the supply rate in Step S110. The packing time at the second pH may be 10-25 hours, such as 20 hours. In this step, the pH of the reaction solution is controlled to be slightly lower than that in the step of obtaining the core precursor by adjusting the amount of the added precipitating agent, for example, the pH can be controlled to 10 or 10.5. As a result, a dense surface layer structure is formed.

According to a specific embodiment of this application, the entire reactants can be added to the reactor within 18-24 hours (including the time for obtaining the core precursor).

S130: Mix the secondary particle precursor with a lithium source, and bake to obtain the secondary particles.

According to an embodiment of the present application, in this step, the secondary particle precursor obtained in Step S120 is mixed with a lithium source and baked, so that the secondary particle precursor is lithiated, and a hollow structure is formed at the same time, thereby obtaining the secondary particles.

According to an embodiment of the present application, in this step, the specific type of the lithium source is not particularly limited, and an appropriate lithium-containing reagent can be selected by those skilled in the art according to actual needs. For example, according to a specific embodiment of the present application, an inorganic salt of lithium, such as nitrate, may be selected. The mixing ratio of the secondary particle precursor and the lithium source is not particularly limited, and can be determined according to the chemical composition of the lithium oxide. The baking treatment may be performed at a baking temperature of 600° C.-800° C.

According to some embodiments of the present application, the lithiation of the secondary particle precursor may be mixing the secondary particle precursor obtained in Step S120 with a lithium salt (i.e., the lithium source) in water. After standing for a period of time, the precipitate is separated and dried by separation methods such as filtration, drying, and evaporation. The dried precipitate is baked at the above-mentioned baking temperature for a baking time that can be 10-18 hours, such as 12 hours. The inventors find that the central area of the secondary particle precursor formed in Step S120 is relatively loose due to loosely packing primary particles, so that during the baking process, a hollow structure with cavities can be formed. The densely packed shell layer also has certain gaps, so that in the subsequent steps, elemental sulfur can pass through the shell layer and enter the cavity for filling. As a result, a core-shell structure with a densely packed surface layer and a cavity in the center is obtained.

In order to improve the quality of the secondary particles, an annealing step is included after the baking treatment. In addition, the baking process may include rapidly raising the temperature to the baking temperature, maintaining at the temperature for a short time, and then annealing. Therefore, it is possible to obtain a better crystal form of ternary material while maintaining the morphology of the secondary particles (particles having a core-shell structure) formed in Step S130. The process specifically includes:

raising the temperature quickly to the roasting temperature in a relatively short period of time, such as 15 min to 1 hour (hr), maintaining at the temperature for 0.5-2 hours, and then quickly cooling to the room temperature. During the rapid cooling, the sample can be directly placed in an environment at the room temperature (where the temperature can be 0-40° C.). The cooling time for rapid cooling can be 20 min to 1 hr, the annealing temperature can be 450° C. to 700° C., such as 500° C., and the annealing time can be 3-8 hours, such as 5 hours.

S200: Fill elemental sulfur in the hollow structure

According to an embodiment of the present application, in this step, the secondary particles are mixed with a sulfur source, followed by a melting and solidification treatment, so as to fill the elemental sulfur in the hollow structure. Elemental sulfur can be melted and penetrate into the hollow structure.

According to an embodiment of the present application, the secondary particles and the sulfur source can be mixed at a weight ratio of (8-12):(0.5-2). For example, the mixing ratio can be 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1 and the like. The sulfur source may be elemental sulfur. The temperature for the melting and solidification treatment can be 120-180° C., such as 130, 140, 150, 160, or 170° C., and the treatment time can be 10-15 hours, such as 11, 12, 13, or 14 hours. Specifically, the treatment can take place at 150° C. for 12 hours. Therefore, sulfur can easily fills in the cavity formed in Step S130.

According to an embodiment of the present application, the melting and solidification treatment may occur under an inert atmosphere. Alternatively, the treatment can take place in a sealed and pressurized container under an inert atmosphere such as nitrogen or argon, where the pressure in the container can be 5-12 MPa, for example, 8 MPa. According to a specific embodiment of the present application, the secondary particles and the sulfur source are mixed and placed in a sealed container, and then an inert gas is filled into the container for pressurization. The pressure after pressurization may be 10 MPa.

Figure 3:
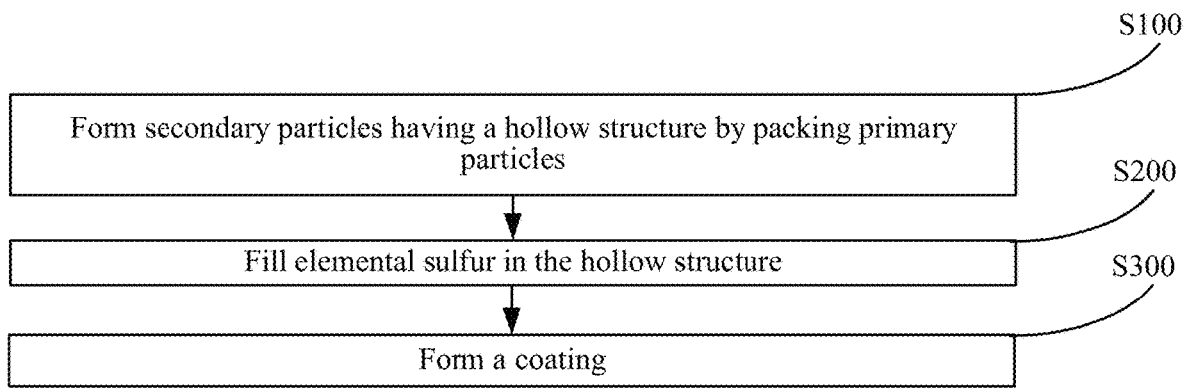
FIG. 3 is a process flow chart of a preparation method according to an embodiment of the present application.

According to an embodiment of this application, to improve the performance of the cathode material prepared by the above method, referring to FIG. 3, the method may further include, after the melting and solidification treatment, S300: Form a coating.

According to an embodiment of the present application, in this step, a coating is formed outside the secondary particles filled with elemental sulfur. A specific method for forming the coating and the chemical composition of the coating are not particularly limited. Choices can be made by those skilled in the art according to the actual situations. For example, the material of the coating can be one or more selected from carbon materials, tin dioxide, manganese dioxide, titanium dioxide, tricobalt tetraoxide, vanadium pentoxide, iron disulfide, copper disulfide, cobalt disulfide, or bismuth trisulfide. The carbon material can be graphite, Ketjen black, graphene, carbon nanotubes, and activated carbon, etc. Methods for forming the coating include, but are not limited to, spray drying, hydrothermal methods, and others. By forming a coating on the outer surface of the secondary particles filled with elemental sulfur, the isolation effect of the elemental sulfur from the electrolyte can be enhanced. When the cathode material is applied to a battery, the cycle performance and stability of the battery can be improved. Based on the total weight of the cathode material, the content of the coating can be 0.1-10 wt %, for example, 5 wt %.

In another aspect of this application, this application proposes a cathode material. According to an embodiment of the present application, the cathode material is prepared by the method as described above. Therefore, the cathode material has all the features and advantages of the cathode material obtained by the aforementioned method, and will not be repeated here again.

In another aspect of this application, this application proposes a lithium ion battery. The lithium ion battery includes the cathode material as described above. Therefore, the lithium ion battery has all the features and advantages of the cathode material as described above, and will not be repeated here again. In general, the lithium ion battery has a higher energy density and a better cycle life.

In another aspect of this application, this application proposes a vehicle. According to an embodiment of the present application, the vehicle includes a lithium ion battery as described above. For example, the vehicle may include a plurality of battery packs composed of the aforementioned lithium ion batteries. Therefore, the vehicle has all the features and advantages of the lithium ion battery as described above, and will not be repeated here again.

The present application is described by using specific examples. It should be noted that the specific examples are merely used for description and do not limit the scope of the present application in any manner. In addition, unless otherwise specified, methods without specific conditions or steps are conventional methods, and the reagents and materials used are commercially available.

Example 1: Production of Cathode Material (1) 50 mmol of nickel nitrate and 50 mmol of cobalt nitrate were dissolved in 100 g of water, and then 5 g of aqueous ammonia (having a concentration of 10% by weight) as a complexing agent was added. The precipitating agent sodium hydroxide was added to adjust the pH to 11. Co-precipitation was carried out at 50° C. for 4 hours, and a core precursor was obtained by filtration.

(2) The amount of sodium hydroxide added was adjusted to adjust the pH to 10.5, and the reaction rate was reduced to one-half of the original rate for slow and dense packing. A secondary particle precursor was obtained after 20 hours.

(3) The secondary particle precursor obtained in Step (2) was mixed with 100 mmol of lithium nitrate in water, removed, and dried. The dried precipitate was heated to 700° C. within 40 min, and then baked at 700° C. for 1 hr. After removal, the material was cooled to a room temperature within 30 min (where the room temperature is the normal room temperature, and may be 10-35° C., for example, 25° C.), and then annealed at 500° C. for 5 hours. Secondary particles with a hollow structure, that is, the ternary cathode material, were obtained.

(4) The ternary cathode material obtained in Step (3) was mixed with elemental sulfur at a weight ratio of 10:1, then thermally treated and reacted at 150° C. for 12 hours. After removal, the material was dried and pulverized to obtain a ternary cathode material compounded with sulfur.

Example 2: Production of Cathode Material (1) 50 mmol of nickel nitrate and 50 mmol of cobalt nitrate were dissolved in 100 g of water, and then 5 g of aqueous ammonia (having a concentration of 10% by weight) as a complexing agent was added. The precipitating agent sodium hydroxide was added to adjust the pH to 11. Co-precipitation was carried out at 50° C. for 4 hours, and a core precursor was obtained by filtration.

(2) The amount of sodium hydroxide added was adjusted to adjust the pH to 10.5, and the reaction rate was reduced to one-half of the original rate for slow and dense packing. A secondary particle precursor was obtained after 20 hours.

(3) The secondary particle precursor obtained in Step (2) was mixed with 100 mmol of lithium nitrate in water, removed, and dried. The dried precipitate was heated to 700° C. within 40 min, and then baked at 700° C. for 1 hr. After removal, the material was cooled to a room temperature within 30 min (25° C.), and then annealed at 500° C. for 5 hours. Secondary particles with a hollow structure, that is, the ternary cathode material, were obtained.

(4) The ternary cathode material obtained in Step (3) was mixed with elemental sulfur at a weight ratio of 10:0.5, then thermally treated and reacted at 150° C. for 12 hours. After removal, the material was dried and pulverized to obtain a ternary cathode material compounded with sulfur.

Example 3: Production of Cathode Material (1) 50 mmol of nickel nitrate and 50 mmol of cobalt nitrate were dissolved in 100 g of water, and then 5 g of aqueous ammonia (having a concentration of 10% by weight) as a complexing agent was added. The precipitating agent sodium hydroxide was added to adjust the pH to 11. Co-precipitation was carried out at 50° C. for 4 hours, and a core precursor was obtained by filtration.

(2) The amount of sodium hydroxide added was adjusted to adjust the pH to 10.5, and the reaction rate was reduced to one-half of the original rate for slowly and densely packing. A secondary particle precursor was obtained after 20 hours.

(3) The secondary particle precursor obtained in Step (2) was mixed with 100 mmol of lithium nitrate in water, removed and dried. The dried precipitate was heated to 700° C. within 40 min, and then baked at 700° C. for 1 hr. After removal, the material was cooled to a room temperature within 30 min (25° C.), and then annealed at 500° C. for 5 hours. Secondary particles with a hollow structure, that is, the ternary cathode material, were obtained.

(4) The ternary cathode material obtained in Step (3) was mixed with elemental sulfur at a weight ratio of 8:1, and then inert argon was filled to pressurize the container to 10 MPa. The material was then thermally treated and reacted at 150° C. for 12 hours. After removal, the material was dried and pulverized to obtain a ternary cathode material compounded with sulfur.

Example 4: Production of Cathode Material with a Coating (1) 50 mmol of nickel nitrate and 50 mmol of cobalt nitrate were dissolved in 100 g of water, and then 5 g of aqueous ammonia (having a concentration of 10% by weight) as a complexing agent was added. The precipitating agent sodium hydroxide was added to adjust the pH to 11. Co-precipitation was carried out at 50° C. for 4 hours, and a core precursor was obtained by filtration.

(2) The amount of sodium hydroxide added was adjusted to adjust the pH to 10.5, and the reaction rate was reduced to one-half of the original rate for slow and dense packing. A secondary particle precursor was obtained after 20 hours.

(3) The secondary particle precursor obtained in Step (2) was mixed with 100 mmol of lithium nitrate in water, removed, and dried. The dried precipitate was heated to 700° C. within 40 min, and then baked at 700° C. for 1 hr. After removal, the material was cooled to a room temperature within 30 min (25° C.), and then annealed at 500° C. for 5 hours. Secondary particles with a hollow structure, that is, the ternary cathode material, were obtained.

(4) The ternary cathode material obtained in Step (3) was mixed with elemental sulfur at a weight ratio of 10:0.5, then thermally treated and reacted at 150° C. for 12 hours. After removal, the material was dried and pulverized to obtain a sulfur-compounded ternary cathode material.

(5) A coating material was coated on the sulfur-compounded ternary cathode material formed in Step (4), so as to form a sulfur-compounded ternary cathode material with a coating.

Comparative Example 1

(1) 50 mmol of nickel nitrate and 50 mmol of cobalt nitrate were dissolved in 100 g of water, and then 5 g of aqueous ammonia (having a concentration of 10% by weight) was added. Sodium hydroxide was added to adjust the pH to 11. Co-precipitation was carried out at 30° C. for 24 hours, and a core precursor was obtained by filtration.

(2) The core precursor and lithium nitrate were mixed in water, removed, dried, and baked at 700° C. for 5 hours to obtain a ternary cathode active material.

(3) The ternary cathode material was directly mixed with elemental sulfur.

Comparative Example 2

(1) 50 mmol of nickel nitrate and 50 mmol of cobalt nitrate were dissolved in 100 g of water, and then 5 g of aqueous ammonia (having a concentration of 10% by weight) was added. Sodium hydroxide was added to adjust the pH to 11. Co-precipitation was carried out at 30° C. for 4 hours, and a core precursor was obtained by filtration. Then the pH was adjusted to 10.5, and the reaction was reduced to one-half of the original rate, for slowly and densely packing. A secondary particle precursor was obtained after 20 hours of reaction.

(2) The secondary particle precursor was mixed with lithium nitrate in water, removed, dried, and then baked at 700° C. for 1 hr. The obtained material was removed while it was at 700° C., rapidly cooled to a room temperature, and then annealed at 500° C. for 5 hours. A ternary cathode active material was obtained.

(3) The ternary cathode material and elemental sulfur were directly mixed at a weight ratio of 10:1.

Comparative Example 3

Elemental sulfur was dissolved in a 10% sodium polyacrylate aqueous solution and stirred. Lithium manganate was added to an aqueous solution containing 5% surfactant, where the weight ratio of lithium manganate to the elemental sulfur added to the sodium polyacrylate aqueous solution was 1:9. The dispersion containing elemental sulfur and the dispersion containing lithium manganate were mixed uniformly, adjusted pH to 8, stood still, and filtered to obtain elemental sulfur-coated lithium manganate, which was dried under vacuum at 80° C. for 12 hours to obtain a cathode material.

Comparative Example 4

Elemental sulfur was dissolved in a 10% sodium polyacrylate aqueous solution and stirred. Glucose was added to an aqueous solution containing 5% surfactant, where the weight ratio of glucose to the elemental sulfur added to the sodium polyacrylate aqueous solution was 1:9. The dispersion liquid containing elemental sulfur and the dispersion liquid containing glucose were uniformly mixed, stood still, and filtered to obtain elemental sulfur-coated lithium manganate, which was dried under vacuum at 70° C. for 12 hours to obtain a cathode material.

Comparative Example 5

Elemental sulfur was dissolved in a 10% sodium polyacrylate aqueous solution and stirred, and lithium nickel cobalt oxide particles were added and mixed at a weight ratio of 1:9, vacuum dried at 70° C. for 12 hours to obtain a cathode material.

Comparative Example 6

Elemental sulfur was dissolved in a 10% sodium polyacrylate aqueous solution and stirred. Primary particle precursor was added to an aqueous solution containing 5% surfactant, where the weight ratio of the precursor to the elemental sulfur added to the sodium polyacrylate aqueous solution was 1:9. The dispersion containing elemental sulfur and the dispersion containing lithium manganate were mixed uniformly, adjusted pH to 8, stood still, and filtered to obtain elemental sulfur-coated primary particle precursor, which was dried under vacuum at 80° C. for 12 hours to obtain a cathode material.

Comparative Example 7

The primary particle precursor was baked at 700° C. for 1 hr. The obtained material was removed while it was at 700° C., rapidly cooled to a room temperature, and then annealed at 500° C. for 5 hours. Primary particles of a ternary cathode active material were obtained. Elemental sulfur was dissolved in a 10% sodium polyacrylate aqueous solution and stirred. The primary particles were added to an aqueous solution containing 5% surfactant at a weight ratio of 1:9. The elemental sulfur coated with the primary particle precursor stood still and was filtered to obtain a composite sulfur particle material coated with primary particles, which was dried under vacuum at 80° C. for 12 hours to obtain a cathode material.

Performance Test

1. Characterization of Morphology

The morphologies of the samples 1 obtained in the above examples and the intermediates during the preparation process were observed under a scanning electron microscope (SEM).

Figure 4:
FIG. 4 shows a scanning electron microscope (SEM) image of secondary particles having a hollow structure prepared in an embodiment of the present application.

Referring to FIG. 4, the sulfur compounded ternary cathode material obtained in Example 1 is spherical particles with a hollow structure and an average shell thickness of about 1–2 μm. The average particle size of the particles is about 10 μm.

Figure 5:
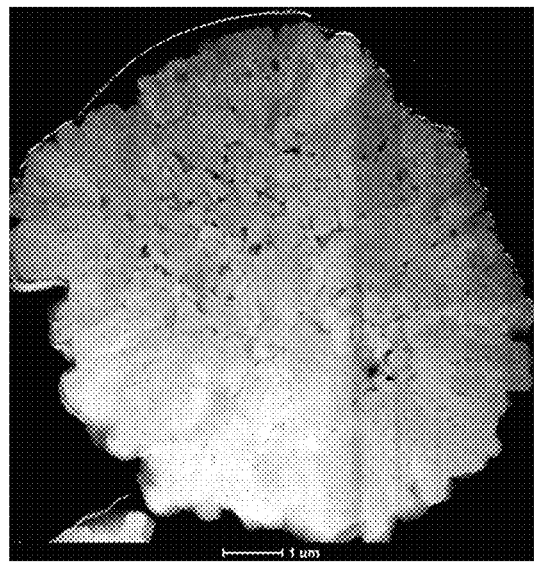
FIG. 5 shows an SEM image of a cathode material prepared in an embodiment of the present application.

It can be seen from FIG. 5 that in the sulfur compounded ternary cathode material obtained in Example 1, elemental sulfur can be more uniformly filled into the cavity of the secondary particles in a considerable amount. The test results are shown in Table 1.

2. Sulfur Content Test

The critical elements in the spherical section were analyzed by energy dispersive X-ray spectroscopy (EDS) on the JSM-7600F field emission scanning electron microscope from JEOL Company. The test results are shown in Table 1.

TABLE 1

| | Test results of samples | | | | | |
|---|---|---|---|---|---|---|
| Sample | Example 1 | Example 2 | Example 3 | Comparative Example 1 | Comparative Example 2 | Comparative Example 3 |
| Sulfur content | 2.4% | 4.6% | 10.7% | 9.1% | 9.1% | 9.7% |

TABLE 1-continued

Test results of samples

| Sample | Example 1 | Example 2 | Example 3 | Comparative Example 1 | Comparative Example 2 | Comparative Example 3 |
|---|---|---|---|---|---|---|
| Average particle size | 5-10 μm | 6-20 μm | 15-25 μm | 10-20 μm | 5-15 μm | 1-5 μm |
| Average thickness of shell layer | 0.5-3 μm | 1-5 μm | 2-10 μm | No | 1-5 μm | No |

It can be seen from the test results that the materials obtainable in the above examples all have considerable sulfur content. Because the materials in the comparative examples do not have a structure that is densely packed in the peripheral area and loosely packed in the center, sulfur is mainly adsorbed peripherally to the particles.

3. Volume Energy Density Test

The specific test method: 5 g of the cathode materials obtained in the above examples and comparative examples were taken respectively, mixed with the cathode conductive agent carbon black and the cathode binder PVDF at a weight ratio of 94:3:3, fed to a mold with a diameter of 2 cm, and pressed under a pressure of 10 Mpa to obtain a powder. The volume energy density of the cathode active material was calculated as follows.

The highest height that the powder can be pressed under the above pressure is h, and the compaction density of the powder is $\rho = 5/\pi r^2 h$.

The energy density is calculated by a formula below:

energy density=specific capacity*average charging voltage*compaction density of the powder, wherein specific capacity=capacity/weight of active material, and average charging voltage=charging current*charging time/total charging capacity The test results are shown in Table 2:

TABLE 2

Test results of energy density of samples

| Sample (cathode material) | Example 1 | Example 2 | Example 3 | Comparative Example 1 | Comparative Example 2 | Comparative Example 3 |
|---|---|---|---|---|---|---|
| Energy density/(wh/L) | 2562 | 2814 | 3051 | 2016 | 1853 | 1548 |

It can be seen from the test results that although the samples obtained in Comparative Examples 1–3 have higher sulfur content in the sulfur content test, their energy density is significantly lower than those of the samples obtained in the Examples. This is because the samples are a cathode material during the sulfur content test, in the samples from the comparative examples formed by direct mixing, some of the sulfur element is adsorbed on the surface of the ternary material by physical adsorption. However, after the cathode material undergoes the above preparation processes, a part of the physically adsorbed elemental sulfur will be lost, but the heat-treated samples from Example 1-Example 3 will not suffer from the loss as that does in the comparative examples. In addition, after the cathode sample is in contact with the electrolyte, the cathode materials prepared in Comparative Example 1 and Comparative Example 3 fail to have the morphology of the particles in Example 1 to Example 3, so the dissolution of elemental sulfur loaded therein after contacting with the electrolyte cannot be alleviated. Although the material in Comparative Example 2 has the morphology of tightly packed exterior and loosely packed interior, a complete core-shell structure is not formed, that is, it does not have a hollow structure. Therefore, elemental sulfur is not located in a hollow structure that is completely protected by a shell layer, so the dissolution of elemental sulfur cannot be well prevented, and the energy density is also low. In addition, the morphology of the particles of Example 1 to Example 3 can also maintain the compaction density of the material as a whole after the compaction process, thereby the energy density of the cathode material is improved.

The cathode material prepared in Comparative Example 3 does not have the core-shell structure of the secondary particles according to the embodiments of the present invention. Therefore, although the sulfur content test results also show a certain sulfur content, the energy density is low, and the cycle performance of the cathode material is worse than the cathode materials prepared in Example 1-Example 3.

Moreover, for the cathode material prepared in Comparative Example 4 that simply uses a carbon coating to isolate the elemental sulfur, the coated cathode material prepared in Comparative Example 5 by simply mixing sulfur and the coating material, followed by post-treatments (such as evaporation of solvent and heating, etc.), the coated cathode material prepared in Comparative Example 6 by mixing sulfur and the coating material, and the sulfur-containing cathode material prepared in Comparative Example 7 that has elemental sulfur as a core and a coating formed outside the core, although the sulfur content test results also show a certain sulfur content, the energy density is lower, and the cycle performance of the cathode material is worse than the cathode material prepared in Example 1-Example 3. It is proved that the cathode material according to embodiments of this application can better prevent the dissolution of elemental sulfur in the electrolyte, well improve the energy density and cycle performance of the cathode material, and improve the performance of the cathode material during use.

In the description of the present specification, the description of the reference terms "an embodiment", "another embodiment" and the like means that specific features, structures, materials or characteristics described in combination with the embodiment are included in at least one embodiment of the present application. In the present specification, the illustrative expression of the above terms is not necessarily referring to the same embodiment or example. Moreover, the described specific features, structures, materials or characteristics may be combined in any suitable manners in one or more embodiments. In addition, in a case that is not mutually contradictory, a person skilled in the art can combine or group different embodiments or examples that are described in the present specification and features of the different embodiments or examples.

In addition, terms "first" and "second" are used only for a purpose of description, and shall not be construed as indicating or implying relative importance or implying a quantity of indicated technical features.

Although the embodiments of the present application have been shown and described above, it can be understood that, the foregoing embodiments are exemplary and should not be understood as limitation to the present application. A person of ordinary skill in the art can make changes, modifications, replacements, or variations to the foregoing embodiments within the scope of the present application.

What is claimed is:

1. A cathode material, comprising elemental sulfur and secondary particles, wherein
   each of the secondary particles is formed by packing primary particles and has a hollow structure and gaps among the primary particles, a coating is formed on an outer surface of each of the secondary particles, and the coating comprises titanium dioxide,
   the elemental sulfur fills in the gaps among the primary particles and in the hollow structure of each of the secondary particles, wherein a content of elemental sulfur in the hollow structure is higher than a content of elemental sulfur in the gaps among the primary particles, and
   the primary particles comprise a lithium oxide, wherein the primary particles are selected from at least one of rod-shaped lithium oxide and bulk lithium oxide, the primary particles have a length of 0.5-2 μm, a width of 200-500 nm, and an aspect ratio of 2-40, a weight ratio of the lithium oxide, the elemental sulfur of the cathode material, and the titanium dioxide is (90-45):(5-50):(2-8), the lithium oxide comprises $\delta LiNi_mCo_nX_{(1-m-n)}O_2 \cdot (1-\delta)Li_2MO_3$, X comprises at least one selected from Mn, Al, Nb, and Fe, M comprises at least one of Mn, Al, Nb, Fe, Co, and Ni, $0<\delta\leq1$, $0\leq m<1$, $0\leq n<1$, and $0<m+n<1$.

2. The cathode material according to claim 1, wherein the secondary particles have an average particle size of 5-50 μm, and the hollow structure has an average pore size of 2-10 μm.

3. The cathode material according to claim 1, wherein the secondary particles comprise a shell layer for defining the hollow structure, and the shell layer is formed by packing the primary particles and has an average thickness of 1-10 μm.

4. The cathode material according to claim 1, wherein based on a total weight of the cathode material, the content of elemental sulfur in the hollow structure is 5-40 wt %, and the content of elemental sulfur in the gaps among the primary particles is 0-15 wt %.

5. The cathode material according to claim 1, wherein the gaps among the primary particles have a length of 0.02-1 μm.

6. The cathode material according to claim 1, wherein the secondary particles are at least one of a spherical, rhombic and ellipsoidal shape.

7. The cathode material according to claim 1, wherein the secondary particles have a porosity of 20-30%.

8. The cathode material according to claim 1, wherein based on a total weight of the cathode material, a content of the coating is 0.1 to 10 wt %.

9. The cathode material according to claim 1, wherein the coating further comprises at least one of carbon, tin dioxide, manganese dioxide, tricobalt tetraoxide, vanadium pentoxide, iron disulfide, copper disulfide, cobalt disulfide, or bismuth trisulfide.

10. A method for preparing a cathode material, comprising:
    stirring and adding a solution containing metal ions, a complexing agent, and a precipitating agent to a reactor, co-precipitating at a pH of 11-12 to form a primary particle precursor, forming a core precursor by packing the primary particle precursor, and forming a secondary particle precursor by further packing the primary particle precursor at a pH of 9-10.5;
    mixing the secondary particle precursor with a lithium source, and baking to obtain secondary particles having a hollow structure; and
    mixing the secondary particles with a sulfur source, melting and solidifying, to fill elemental sulfur into the hollow structure, wherein
    the secondary particles have a shell layer for defining the hollow structure, and the shell layer is formed by packing the primary particles, and
    the primary particles comprise lithium oxide comprising $\delta LiNi_mCo_nX_{(1-m-n)}O_2:(1-\delta)Li_2MO_3$, in which, X comprises at least one selected from Mn, Al, Nb, and Fe, M comprises at least one selected from Mn, Al, Nb, Fe, Co, and Ni, $0<\delta\leq1$, $0<m<1$, $0\leq n<1$, and $0<m+n<1$;
    wherein the solution containing metal ions comprises one or more of a solution containing Mn ions, a solution containing Al ions, a solution containing Nb ions, a solution containing Fe ions, a solution containing Co ions, and a solution containing Ni ions;
    the complexing agent comprises aqueous ammonia; and
    the precipitating agent comprises one or two of potassium hydroxide and sodium hydroxide.

11. The method according to claim 10, wherein a time for co-precipitation at a pH of 11-12 is 2-6 hours, and a time for packing at a pH of 9-10.5 is 10-25 hours.

12. The method according to claim 10, wherein the secondary particles and the sulfur source are mixed at a weight ratio of (8-12):(0.5-2), a temperature for the melting and solidification is 120° C.-180° C., and a time for the melting and solidification is 10-15 hours.

13. A lithium ion battery, comprising a cathode material comprising elemental sulfur and secondary particles, wherein
    each of the secondary particles is formed by packing primary particles and has a hollow structure and gaps among the primary particles, a coating is formed on an outer surface of each of the secondary particles, and the coating comprises titanium dioxide,
    the elemental sulfur is filled in the gaps among the primary particles and in the hollow structure of each of the secondary particles, wherein a content of elemental sulfur in the hollow structure is higher than a content of elemental sulfur in the gaps among the primary particles, and the primary particles comprise a lithium oxide, wherein the primary particles are selected from at least one of rod-shaped lithium oxide and bulk lithium oxide, the primary particles have a length of 0.5-2 μm, a width of 200-500 nm, and an aspect ratio of 2-40, a weight ratio of the lithium oxide, the elemental sulfur of the cathode material, and the titanium dioxide is (90-45):(5-50):(2-8), the lithium oxide comprises $\delta LiNi_m Co_n X_{(1-m-n)}O_2 \cdot (1-\delta)Li_2MO_3$, X comprises at least one selected from Mn, Al, Nb, and Fe, M comprises at least one of Mn, Al, Nb, Fe, Co, and Ni, Fe, Co, and Ni, $0<\delta\leq1$, $0<m<1$, $0\leq n<1$, and $0<m+n<1$.

14. The lithium ion battery according to claim 13, wherein the secondary particles have an average particle size of 5-50 μm, and the hollow structure has an average pore size of 2-10 μm.

15. The lithium ion battery according to claim 13, wherein the secondary particles comprise a shell layer for defining the hollow structure, and the shell layer is formed by packing the primary particles and has an average thickness of 1-10 μm.

16. The lithium ion battery according to claim 13, wherein based on a total weight of the cathode material, the content of elemental sulfur in the hollow structure is 5-40 wt %, and the content of elemental sulfur in the gaps among the primary particles is 0-15 wt %.

17. The lithium ion battery according to claim 13, wherein the gaps among the primary particles have a length of 0.02-1 μm.

18. The lithium ion battery according to claim 13, wherein the secondary particles are at least one of a spherical, rhombic and ellipsoidal shape.

19. The lithium ion battery according to claim 13, wherein the secondary particles have a porosity of 20-30%.

20. The lithium ion battery according to claim 13, wherein based on a total weight of the cathode material, a content of the coating is 0.1 to 10 wt %.

* * * * *

UNITED STATES PATENT AND TRADEMARK OFFICE
CERTIFICATE OF CORRECTION

PATENT NO. : 12,145,860 B2
APPLICATION NO. : 17/259106
DATED : November 19, 2024
INVENTOR(S) : Dongjie Hu and Hao Wei Page 1 of 1

It is certified that error appears in the above-identified patent and that said Letters Patent is hereby corrected as shown below:

In the Specification

In Column 3, Line 50, that reads "the chemical formula of lithium oxide is 8LiN-" should read – the chemical formula of lithium oxide is $\delta$LiN –

In Column 7, Line 54, that reads "includes at least one of Mn, Al, Nb, Fc, Co, and Ni" should read – includes at least one of Mn, Al, Nb, Fe, Co, and Ni –

In the Claims

In Column 17, Line 49, Claim 1, that reads "$0<\delta\leq1, 0\leq m<1, 0\leq n<1$" should read – $0<\delta\leq1, 0<m<1, 0\leq n<1$ –

In Column 18, Line 34, Claim 10, that reads "$\delta LiNi_m Co_n X_{(1-m-n)} O_2 : (1-\delta) Li_2 MO_3$" should read – $\delta LiNi_m Co_n X_{(1-m-n)} O_2 \cdot (1-\delta) Li_2 MO_3$ –

Signed and Sealed this
Twenty-seventh Day of May, 2025

Coke Morgan Stewart
*Acting Director of the United States Patent and Trademark Office*